(12) United States Patent
Imazato

(10) Patent No.: US 8,847,697 B2
(45) Date of Patent: Sep. 30, 2014

(54) COMMUNICATION SYSTEM

(75) Inventor: Masaharu Imazato, Tokyo (JP)

(73) Assignee: NEC Corporation, Tokyo (JP)

( * ) Notice: Subject to any disclaimer, the term of this patent is extended or adjusted under 35 U.S.C. 154(b) by 422 days.

(21) Appl. No.: 13/390,045

(22) PCT Filed: Jun. 25, 2010

(86) PCT No.: PCT/JP2010/004233
§ 371 (c)(1),
(2), (4) Date: Feb. 10, 2012

(87) PCT Pub. No.: WO2011/027498
PCT Pub. Date: Mar. 10, 2011

(65) Prior Publication Data
US 2012/0139657 A1 Jun. 7, 2012

(30) Foreign Application Priority Data
Sep. 1, 2009 (JP) ................. 2009-202115

(51) Int. Cl.
*H04B 3/28* (2006.01)
*H04B 10/00* (2013.01)
*H04B 5/00* (2006.01)

(52) U.S. Cl.
CPC .............. *H04B 10/00* (2013.01); *H04B 5/0037* (2013.01)
USPC .......................................................... 333/12

(58) Field of Classification Search
USPC .......................................................... 333/12
See application file for complete search history.

(56) References Cited

U.S. PATENT DOCUMENTS

| | | | |
|---|---|---|---|
| 5,160,806 A | 11/1992 | Harada et al. | |
| 6,462,436 B1 * | 10/2002 | Kay et al. | 307/91 |
| 6,822,161 B2 * | 11/2004 | Komatsu et al. | 174/367 |
| 7,709,749 B2 * | 5/2010 | Meier | 174/377 |
| 8,023,890 B2 * | 9/2011 | Washiro | 455/41.1 |
| 8,253,037 B2 * | 8/2012 | Teo et al. | 174/363 |

FOREIGN PATENT DOCUMENTS

| | | |
|---|---|---|
| CN | 1527438 A | 9/2004 |
| CN | 101145811 A | 3/2008 |
| CN | 101507129 A | 8/2009 |
| JP | 4-010499 A | 1/1992 |
| JP | 10-209665 A | 8/1998 |
| JP | 2002-043834 A | 2/2002 |
| JP | 2003-115694 A | 4/2003 |
| JP | 2007-082178 A | 3/2007 |

(Continued)

OTHER PUBLICATIONS

International Search Report of PCT/JP2010/004233, dated Jul. 27, 2010.

(Continued)

*Primary Examiner* — Robert Pascal
*Assistant Examiner* — Kimberly Glenn
(74) *Attorney, Agent, or Firm* — Sughrue Mion, PLLC

(57) ABSTRACT

A communication system of the present invention includes: a communication coupler that transmits a signal; and a signal transmitting apparatus that communicates by propagating, as an electromagnetic field, the signal transmitted from the communication coupler, the communication coupler includes a coupler case disposed on the signal transmitting apparatus, a noise suppressing section is provided on a lower end surface of the coupler case, the lower end surface faces the signal transmitting apparatus, and the noise suppressing section suppresses noise by creating a high impedance.

10 Claims, 12 Drawing Sheets

(56) References Cited

FOREIGN PATENT DOCUMENTS

| | | |
|---|---|---|
| JP | 2007-150654 A | 6/2007 |
| JP | 2007-281678 A | 10/2007 |
| JP | 2008-103902 A | 5/2008 |
| WO | WO 2006/032339 A1 | 3/2006 |

OTHER PUBLICATIONS

Office Action dated Nov. 12, 2013, issued by the State Intellectual Property Office of the P.R.C. in corresponding Chinese Application No. 201080038418.1.

* cited by examiner

COMMUNICATION SYSTEM

CROSS REFERENCE TO RELATED APPLICATIONS

This application is a National Stage of International Application No. PCT/JP2010/004233 filed Jun. 25, 2010, claiming priority based on Japanese Patent Application No. 2009-202115 filed Sep. 1, 2009 the contents of all of which are incorporated herein by reference in their entirety.

TECHNICAL FIELD

The present invention relates to a communication system, which includes a signal transmitting apparatus having a lattice pattern, and a communication coupler disposed on its top and transmits signals to the signal transmitting apparatus. In particular, it relates to a communication system having a noise suppressing structure, which suppresses electromagnetic leakage from the communication coupler.

BACKGROUND ART

In recent years, a communication technology has existed whereby communication or power transfer between desired points on a two-dimensional signal transmitting apparatus is realized by using electromagnetic coupling of a local electromagnetic field. This is a communication technology that enables communication or power transfer between desired communication couplers via a signal transmitting apparatus in a communication system in which a grid-like pattern is provided in a planar surface of the signal transmitting apparatus, and a communication coupler for communication or power transfer is disposed on the grid-like pattern.

For such a communication technology, a communication system as shown in FIG. 18 to FIG. 20 is provided, for example.

The communication system shown in the figures includes a sheet-like signal transmitting apparatus 1, serving as a communication medium, and a communication coupler 2. The signal transmitting apparatus 1 is a sheet-like structure, and has a ground layer 3, a grid-like pattern electrode 4, a protective layer 5, and a dielectric layer 6. The ground layer 3 forms a lower electrode. The grid-like pattern electrode 4 is a mesh shape, and is located at a distance from the ground layer 3. The protective layer 5 is provided on the top of the grid-like pattern electrode 4, and prevents the pattern electrode 4 from making contact with the communication coupler 2 directly. The dielectric layer 6 is provided in a region sandwiched between the ground layer 3 and the grid-like pattern electrode 4.

As shown in FIG. 20, the communication coupler 2 has a plate shaped antenna circuit 10 for communication signals or power transmission and reception, a signal/power transmission and reception circuit (omitted from the figure), which are disposed on the signal transmitting apparatus 1, and a cup-shaped coupler case 11 which is formed such that it covers the antenna circuit 10.

With such a construction, communication signals are turned into an electromagnetic field via the antenna circuit 10 of the coupler case 11, and after being injected into the signal transmitting apparatus 1, are propagated through the signal transmitting apparatus 1 so that communication is performed between the communication coupler 2 and another communication coupler (omitted from the figure).

Other than the technology shown in the above-described FIG. 18 to FIG. 20, as shown in Patent Documents 1 to 3, a technology is disclosed in which, in a communication apparatus, an electromagnetic field is made to exist in a region sandwiched by sheet-like bodies, being current-carrying parts facing each other, and an electromagnetic field is advanced by changing the applied voltage between the two sheet bodies.

Especially in Patent Document 2 among these Patent Documents, a communication coupler with the construction shown in FIG. 21 is disclosed.

A communication coupler 20 has an inner conductor 21, an outer conductor 23, and a coaxial cable 24 as shown in the cross-sectional diagram of FIG. 21. The inner conductor 21 is disk-shaped. The outer conductor 23 is cup-shaped, covers the inner conductor 21, and forms a coupler case 22. The coaxial cable 24 is connected to the inner conductor 21 and the outer conductor 23. The end of the coaxial cable 24 is connected to the communication equipment 25. With such a construction, an electromagnetic field input and output from the communication equipment 25 is transmitted to the coaxial cable 24, and after it is propagated between the inner conductor 21 and the outer conductor 23 of the communication coupler 2, and injected into the signal transmitting apparatus 1, it is propagated in the signal transmitting apparatus 1, so that communication is performed between the communication coupler 20 and another communication coupler (omitted from the figure).

In Patent Document 4, a technology regarding a communication device is disclosed, which includes a position retention mechanism that performs position adjustment such that electrostatic coupling is effected between electrodes at the tips of surface wave transmission line parts installed in a transmission electrode and a reception electrode, and furthermore retains the position.

PRIOR ART DOCUMENTS

Patent Documents

[Patent Document 1] PCT International Publication No. 2006/32339
[Patent Document 2] Japanese Unexamined Patent Application, First Publication No. 2007-082178
[Patent Document 3] Japanese Unexamined Patent Application, First Publication No. 2007-281678
[Patent Document 4] Japanese Unexamined Patent Application, First Publication No. 2008-103902

SUMMARY OF THE INVENTION

Problem to be Solved by the Invention

In communication devices shown in the above-described FIG. 18 to FIG. 20, and Patent Documents 1 to 4, there is a case in which a junction structure as shown in FIG. 22 is used in the coupler case 11 of the communication coupler 2 and the signal transmitting apparatus 1. In such a junction structure, in FIG. 22, a signal current for communication or power transfer flows from the inside 12 (right side in FIG. 22) of the communication coupler 2 through the junction between the coupler case 11 and the signal transmitting apparatus 1 to the outside 13 (left side in FIG. 22) of the communication coupler 2, and is dissipated outside of the communication system as noise.

FIG. 23 shows an equivalent circuit of the junction noise propagation of FIG. 22. In FIG. 23, the surface resistance of the junction of the coupler case 11 with the signal transmitting apparatus 1 is denoted as "Rs", and the impedance between the coupler case 11 and the signal transmitting apparatus 1 is denoted as "Zc". The signal current generated in the inside 12 of the communication coupler 2 is split between "Ic", which flows to the inside 12 of the communication coupler 2 via Zc as shown by arrow A, and "Id", which flows to the outside 13 of the communication coupler via Rs as shown by arrow B. The impedance Zc is determined by the capacitance C between the conductors of the lower end surface of the coupler case 11, and the signal transmitting apparatus 1, as shown by "Zc=1/ωC=1/2πfC".

Where f is the signal frequency. Considering the area of the coupler case 11 which faces the signal transmitting apparatus 1, and the dielectric constant of the signal transmitting apparatus, the capacitance C is approximately 10 pF. Considering GHz region communication frequencies, the impedance Zc is several Ω. Furthermore, if it is assumed that the case is metal, the surface resistance of the junction of the coupler case 11 is of the order of milliohms. Therefore, the relation between Rs and Zc is "Rs<<Zc". Consequently, Id is almost comprised by the noise current, and flows into the outside 13 of the communication coupler 2 as a noise current, causing noise emission. Depending on the noise emission level, there is a possibility that it exceeds the electric field strength regulations applicable to a device. Thus there is a case in which it cannot be used as a communication system.

A communication equipment disclosed in Patent Document 4 simply includes a position retention mechanism that performs position adjustment such that electrostatic coupling is generated between electrodes at the tips of the surface wave transmission line parts of a transmission electrode and a reception electrode, and retains that position. Since this communication device does not include a structure that suppresses noise emission, there is a concern that noise emission is caused.

The present invention has been made in view of the above-mentioned circumstances, and an object thereof is to provide an electromagnetic field leakage suppressing structure that suppresses noise emitted outside of a coupler case by providing a structure in which noise current is not likely to flow into the lower end surface of the coupler case, which faces a signal transmitting apparatus.

Means for Solving the Problem

In order to solve the above problems, a communication system of the present invention includes: a communication coupler that transmits a signal; and a signal transmitting apparatus that communicates by propagating, as an electromagnetic field, the signal transmitted from the communication coupler, the communication coupler includes a coupler case disposed on the signal transmitting apparatus, a noise suppressing section is provided on a lower end surface of the coupler case, the lower end surface faces the signal transmitting apparatus, and the noise suppressing section suppresses noise by creating a high impedance.

Effect of the Invention

According to the present invention, in a communication system including a signal transmitting apparatus and a communication coupler, a noise suppressing section that suppresses noise by creating a high impedance is provided on a lower end surface of the coupler case, which faces the signal transmitting apparatus. With this construction, current is suppressed from flowing to the outside of the communication coupler from the inside of the communication coupler. By reducing the noise current flowing to the outside of the coupler case, the noise emission is reduced, so that it is possible to satisfy the electric field intensity regulations applicable to a communication system.

EMBODIMENTS FOR CARRYING OUT THE INVENTION

First Exemplary Embodiment

A first exemplary embodiment of the present invention will be described with reference to FIG. 1 to FIG. 7.

Figure 1:
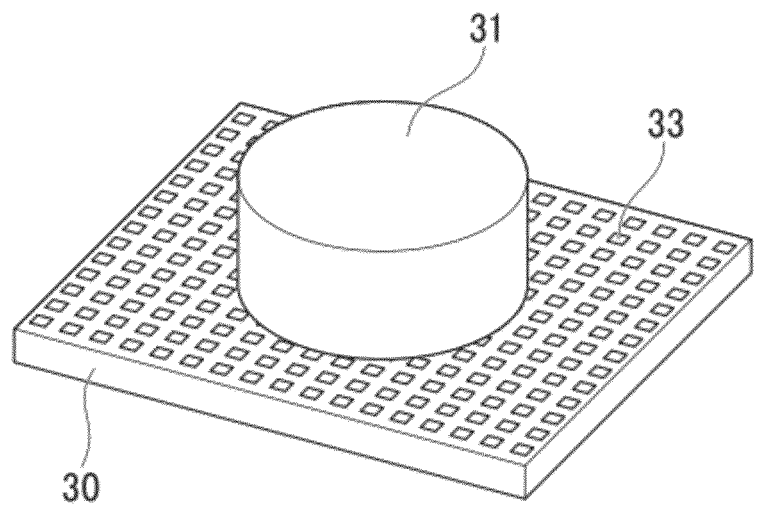
FIG. 1 is a perspective view showing a communication system of a first exemplary embodiment of the present invention.
Figure 2:
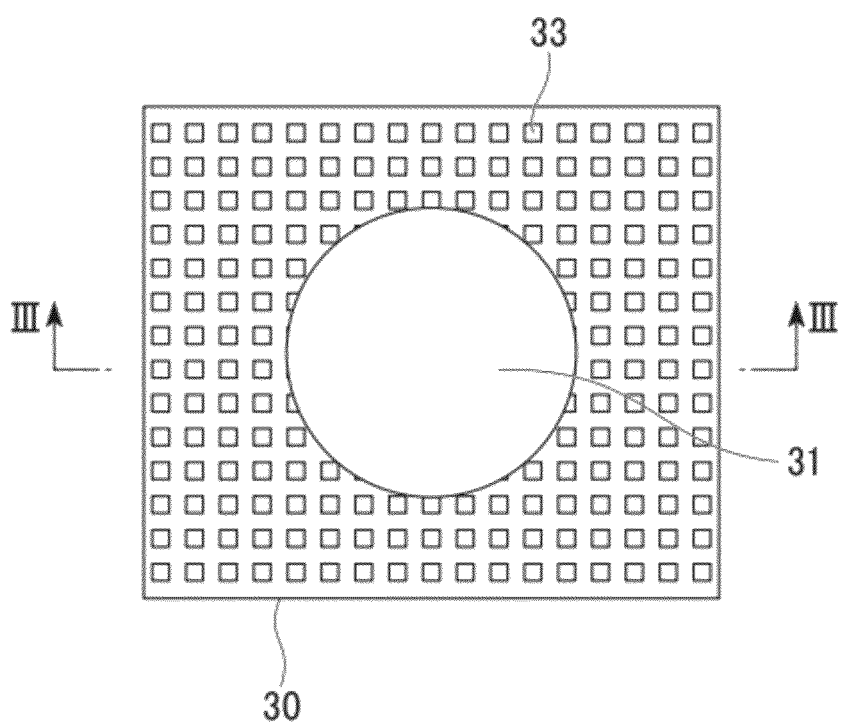
FIG. 2 is a plan view of the communication system shown in FIG. 1.
Figure 3:
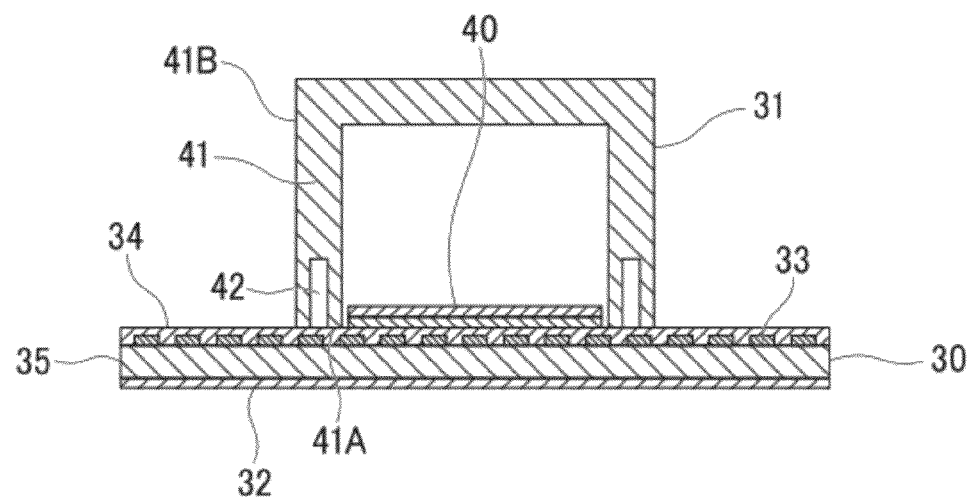
FIG. 3 is a front cross-sectional diagram along line III-III of FIG. 2 and FIG. 10.

A communication system according to the present invention as shown in FIG. 1 to FIG. 3 includes a sheet-shaped signal transmitting apparatus 30 serving as a communication medium, and a cup-shaped communication coupler 31 which is disposed on the top of the signal transmitting apparatus 30.

The signal transmitting apparatus 30 is a sheet-shaped structure as shown in FIG. 3, and includes a ground layer 32, a grid-like pattern electrode 33, a protective layer 34, and a dielectric layer 35. The ground layer 32 forms a lower electrode. The grid-like pattern electrode 33 is a mesh shape, and is located at a distance from the ground layer 32. The protective layer 34 is provided on the top of the grid-like pattern electrode 33, and prevents the grid-like pattern electrode 33 from making contact with the communication coupler 31 directly. The dielectric layer 35 is provided in the region sandwiched between the ground layer 32 and the grid-like pattern electrode 33.

The communication coupler 31 as shown in FIG. 3, has an antenna circuit 40, a signal/power transmission and reception circuit (omitted from the figure), and a coupler case 41. The antenna circuit 40 is sheet-shaped, is disposed on the signal transmitting apparatus 30, and is used for communication signals or power transmission and reception. The coupler case 41 is cup-shaped, is formed such that it covers the antenna circuit 40, and its base is open.

With such a construction, communication signals are turned into an electromagnetic field via the antenna circuit 40 of the coupler case 41, and after being injected into the signal transmitting apparatus 30, are propagated in the signal transmitting apparatus 30 so that communication is performed between the communication coupler 31 and another communication coupler (omitted from the figure).

Figure 4:
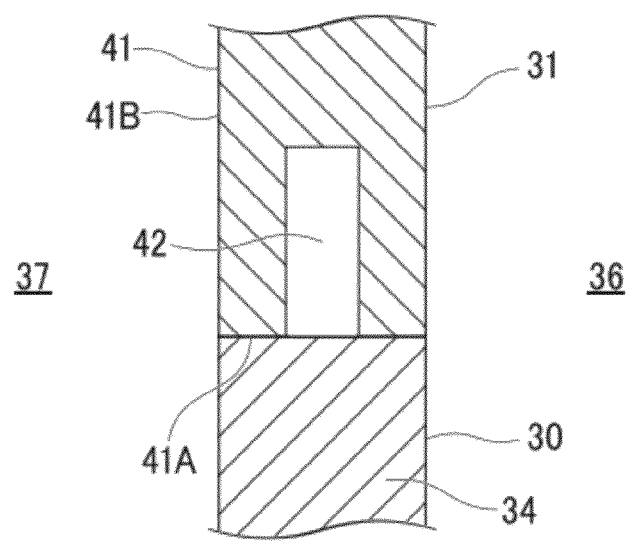
FIG. 4 is a front cross-sectional diagram in which a contact section of a communication coupler and a signal transmitting section shown in FIG. 3 are enlarged.

In the coupler case 41, a groove 42 that creates a high impedance is provided in a lower end surface 41A which makes contact with the protective layer 34 of the signal transmitting apparatus 30. The groove 42 is a concave shape body as shown in detail in FIG. 4, which is formed from the center of the lower end surface 41a of the coupler case 41 upward within the coupler case 41 following the wall surface. In FIG. 4, the right hand side indicates the inside 36 of the communication coupler 31, and the left hand side indicates the outside 37 of the coupler case 41.

Figure 5:
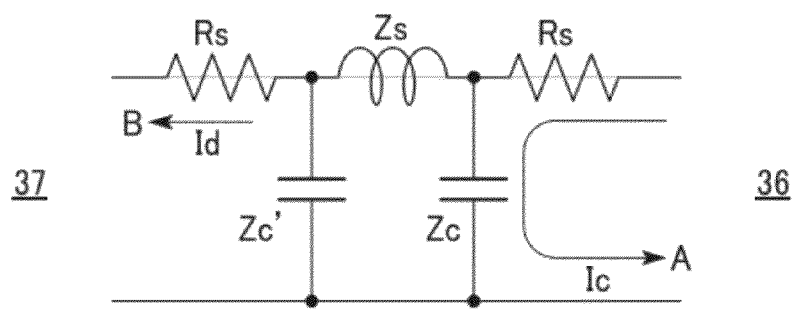
FIG. 5 is a diagram showing an equivalent circuit of the contact section of a coupler case of the communication coupler and the signal transmitting apparatus shown in FIG. 3.

FIG. 5 shows an equivalent circuit of the detail of the contact section of the coupler case 41 of the communication coupler 31 and the signal transmitting apparatus 30 shown in FIG. 4. In FIG. 5, the contact resistance of the lower end surface 41A of the coupler case 41 is denoted by "Rs", the impedance between the coupler case 41 and the signal transmitting apparatus 30 by "Zc" and "Zc'", and the impedance of the groove 42 provided in the lower end surface of the coupler case 41 by "Zs".

In the equivalent circuit of FIG. 5, a signal current for communication or power transfer in the inside 36 of the communication coupler 31 flows through Rs, and is distributed into current Ic, which returns to the inside 36 of the communication coupler 31 via Zc as shown by arrow A, and Id, which flows to the outside 37 of the communication coupler 31 via Zc and Rs as shown by arrow B.

Figure 23:
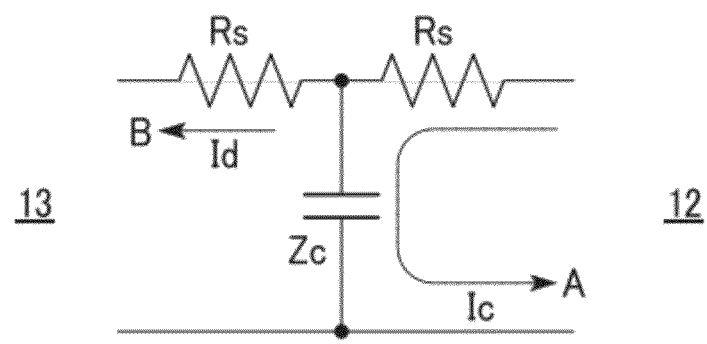
FIG. 23 is a diagram showing an equivalent circuit of a contact section of a coupler case of the communication coupler and a signal transmitting apparatus according to the conventional technique.

Zs is the additional impedance due to the current path being extended by the groove 42. When the equivalent circuit shown in FIG. 5 and the equivalent circuit of the detail of the contact section of the communication coupler 2 and the signal transmitting apparatus 1 according to a conventional technique shown in FIG. 23 are compared, the relation between Rs and Zc, Zc' is "Rs<<Zc, Zc'". Therefore, the Id that flows to the outside 37 of the communication coupler 31 with respect to the Id that flows to the outside 13 of the communication coupler 2 in the conventional structure of FIG. 23 is "Id (conventional structure)/Id (structure of exemplary embodiment of the present invention)=(2Rs+Zs)/2Rs=1+Zs/2Rs". As a result, by using the construction according to the exemplary embodiment of the present invention, the impedance increases and the current decreases proportionally to the impedance due to the surface resistance of the groove. That is, the current that flows to the outside 37 of the communication coupler 31 decreases due to the groove impedance created by the groove 42, so that it is possible to reduce the noise emitted to the outside 37 of the communication coupler 31.

The local magnetic field distribution in which noise leakage from the communication coupler and the signal transmitting apparatus is obtained by electromagnetic field simulation will be described with reference to FIG. 6 to FIG. 8.

Figure 6:
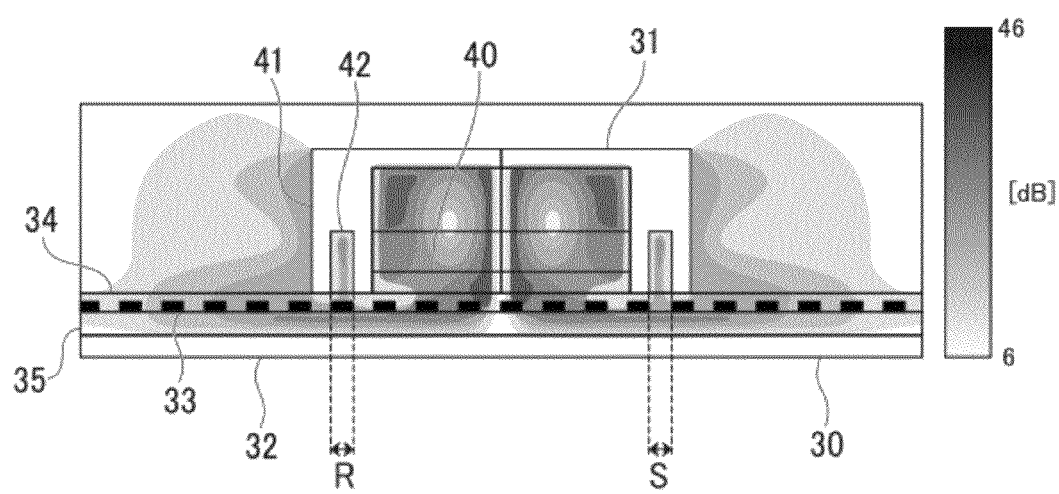
FIG. 6 is a diagram showing the noise leakage state of the communication coupler having a groove and the signal transmitting apparatus according to the first exemplary embodiment as a local magnetic field distribution obtained by electromagnetic field simulation.

FIG. 6 shows the noise leakage state of the communication coupler 31 having the groove 42, and the signal transmitting apparatus 30, as a local magnetic field distribution obtained by electromagnetic field simulation. FIG. 6 shows the local magnetic field strength as a cross sectional diagram along line III-III shown in FIG. 2 using a gray scale.

Figure 7:
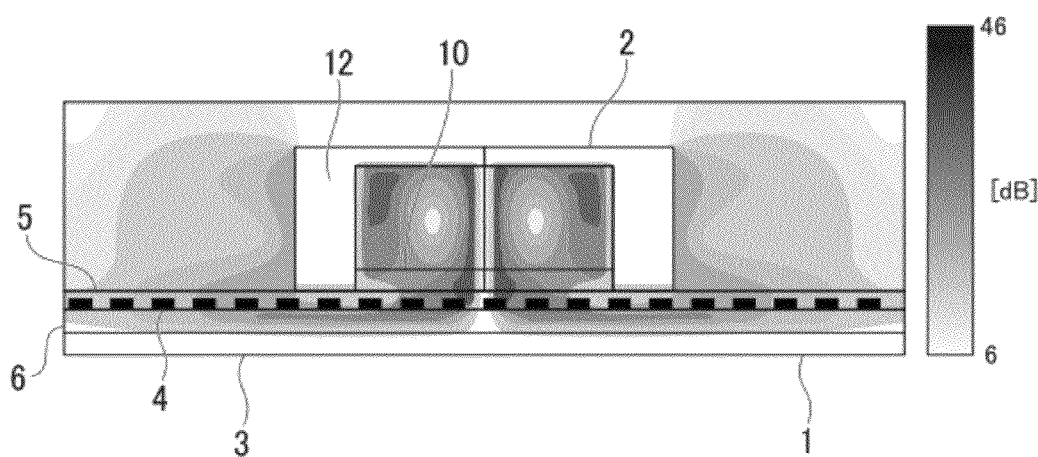
FIG. 7 is a diagram showing the noise leakage state of a communication coupler and a signal transmitting apparatus according to a conventional technology as a local magnetic field distribution obtained by electromagnetic field simulation.
Figure 18:
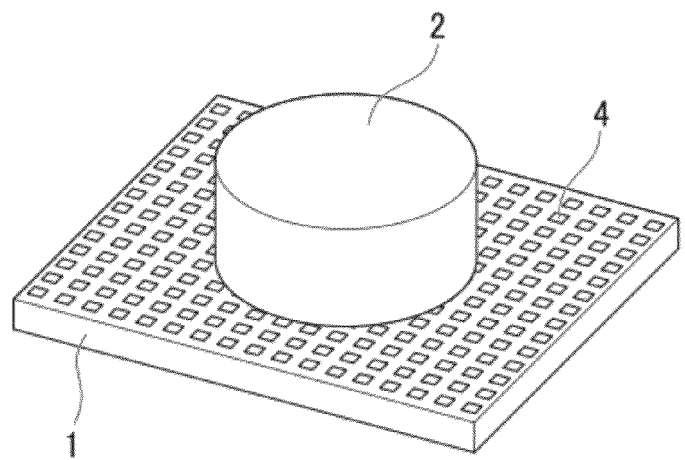
FIG. 18 is a perspective view showing a communication system according to a conventional technology.
Figure 19:
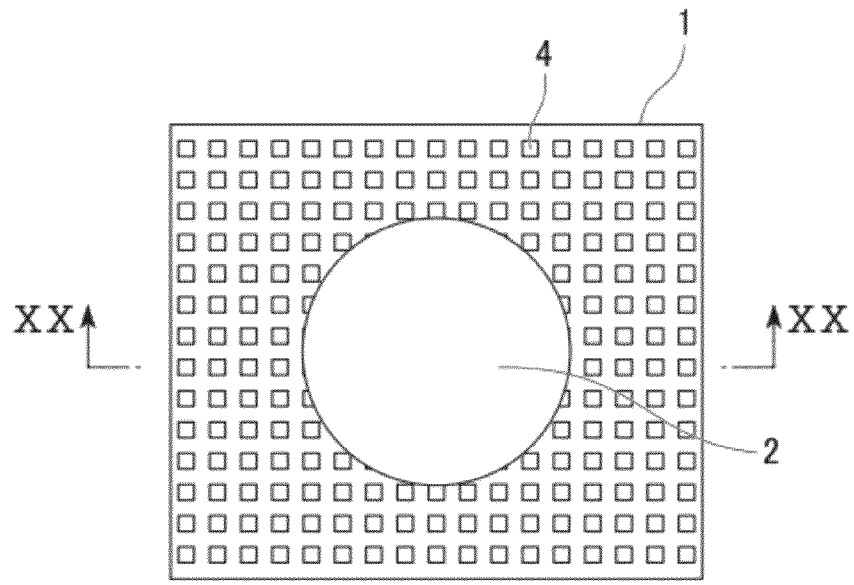
FIG. 19 is a plan view of the communication system shown in FIG. 18.
Figure 20:
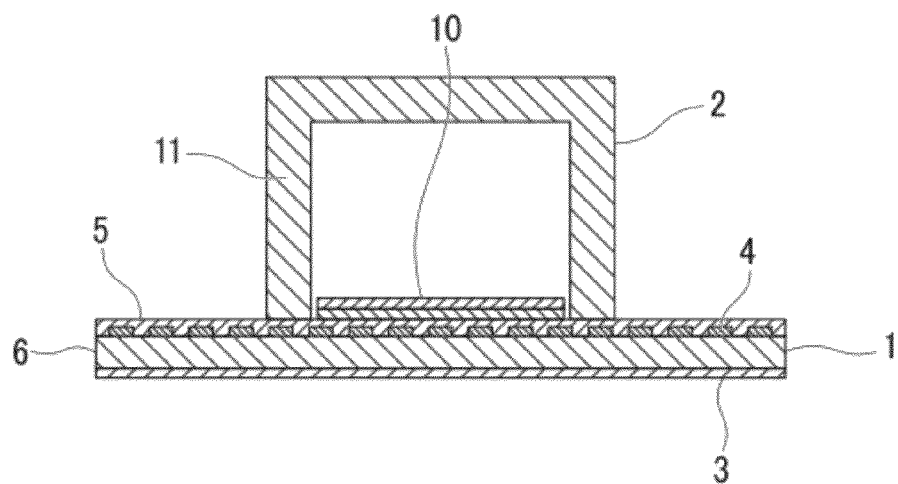
FIG. 20 is a front cross-sectional diagram along line XX-XX of FIG. 19.
Figure 21:
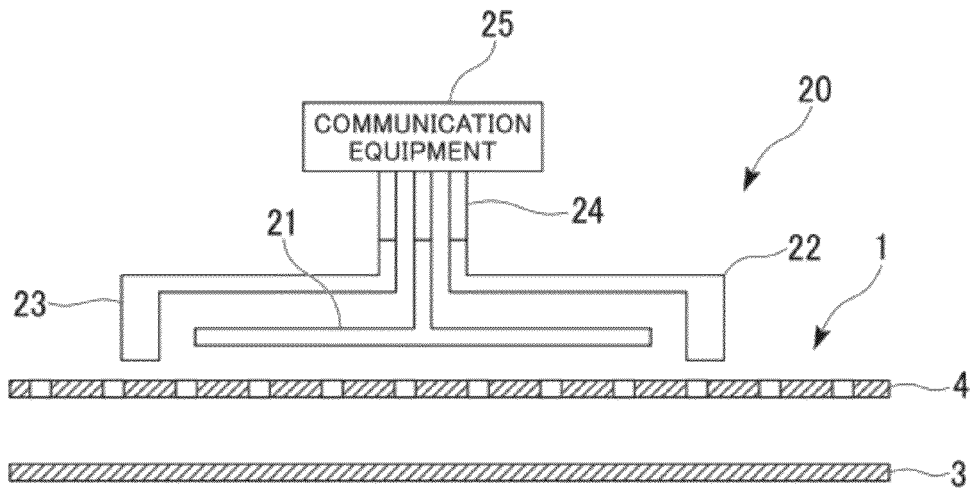
FIG. 21 is a front cross-sectional diagram showing a communication system according to another conventional technology.
Figure 22:
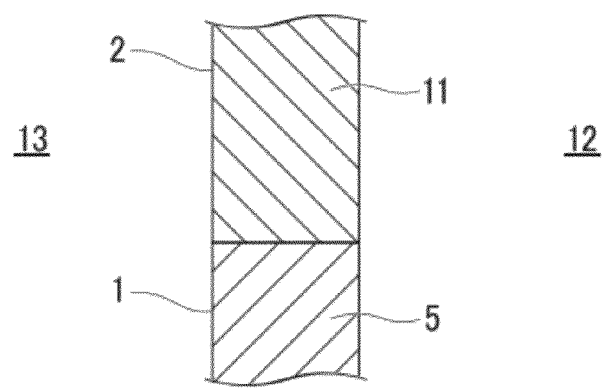
FIG. 22 is a front cross-sectional diagram of a contact section of a communication coupler and signal transmitting section according to the conventional technique.

FIG. 7 is a diagram showing the noise leakage of the communication coupler 2 and the signal transmitting apparatus 1 (refer to FIG. 18 to FIG. 20) according to a conventional technique as a local magnetic field distribution obtained by electromagnetic field simulation. FIG. 7 shows the local magnetic field strength as a XX-XX line cross-sectional diagram structure shown in FIG. 19 using a gray scale.

In such magnetic field distributions, the greater the magnetic field strength, the darker the colour, and the lower the magnetic strength, the lighter the colour.

In FIG. 6 and FIG. 7, when the local magnetic field distributions on the outside of the junction of the signal transmitting apparatus 30 and the communication coupler 31 are compared, it can be understood that the strong magnetic field area in the local magnetic field distribution of the first exemplary embodiment having the groove 42 is reduced compared with the strong magnetic field area in the conventional structure that does not have the groove 42. Observing the magnetic field strengths outside of the communication couplers 2 and 31, referring to the scales shown by the strength graphs on the right hand sides of FIG. 6 and FIG. 7, in the structure according to the first exemplary embodiment of the present invention, it was confirmed that a magnetic field strength reduction greater than or equal to 3 times (2 dB×3=6 dB) can be realized compared with the conventional structure.

Furthermore, in a remote electric field strength calculation by electromagnetic field simulation, it was confirmed that the electric field strength from a communication system (refer to FIG. 18 to FIG. 20) according to the conventional technique was 3 dB or more lower than the electric field strength according to the exemplary embodiment of the present invention.

In a communication system according to the first exemplary embodiment of the present invention shown in FIG. 6, there are grooves 42 on the left and right of the communication coupler 31. It is configured such that directly below the groove 42 on the left side in FIG. 6 (shown by reference symbol R), a track of the grid-like pattern electrode 33 exist. On the other hand, it is configured such that directly below the groove 42 on the right side in FIG. 6 (shown by reference symbol S), no track of the grid-like pattern electrode 33 exists.

Figure 8:
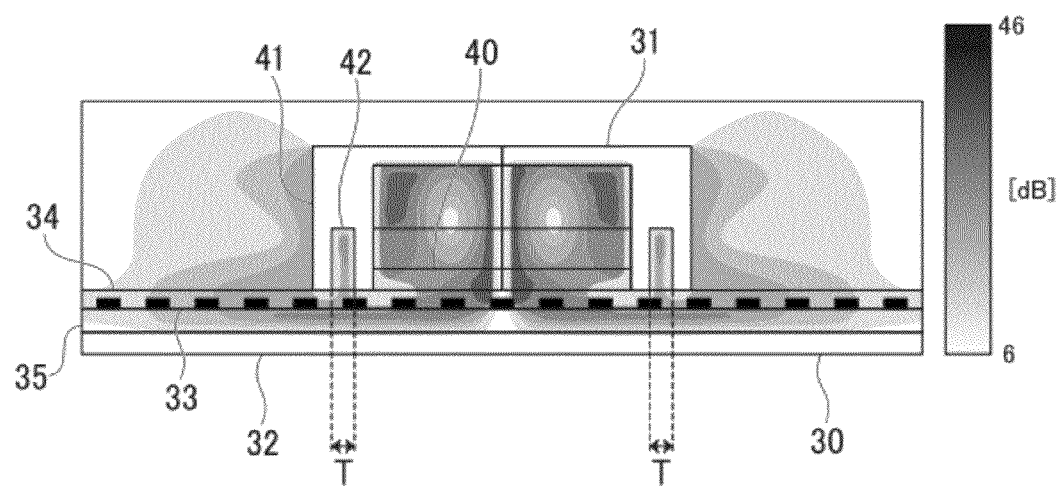
FIG. 8 is a diagram showing the positional relationship of the groove of the communication coupler and tracks of a grid-like pattern electrode according to the first exemplary embodiment.

Moreover, FIG. 8 also shows a communication system according to the first exemplary embodiment of the present invention. However, the construction is different from that of the communication system of FIG. 6. That is, in the communication system shown in FIG. 8 there are grooves 42 on the left and right of the communication coupler 31. It is configured such that directly below the groove 42 on the left side in FIG. 8 and directly below the groove 42 on the right side in FIG. 8 (shown by reference symbol T), parts of tracks of the grid-like pattern electrode 33 exist.

Examining the electric field strengths of the structures on which the existence of the grid-like pattern electrode 33 has influence, from the electromagnetic field simulations shown in FIG. 6 and FIG. 8, compared with the communication system shown in FIG. 6, the electric field strength dropped overall in the communication system shown in FIG. 8.

As a result, it is understood that if the grid-like pattern arrangement and the track width directly under the grooves provided in the coupler case 41 comply with the following conditions, a noise reduction effect can be obtained. The width of the groove 42 is denoted by "W", and the track width of the grid-like pattern of the grid-like pattern electrode 33 is denoted by "W'". The condition to obtain a noise reduction effect is that tracks of the grid-like pattern electrode 33 are located underneath (directly below) the grooves 42, and it is set such that "W>W'", so that the width "W'" of the tracks of the grid-like pattern electrode 33 does not exceed the width "W" of the grooves 42.

As described in detail above, in the communication system according to the present first exemplary embodiment, by providing grooves 42 that create a high impedance, in the lower end surface 41A of the coupler case 41 of the communication coupler 31, which faces the signal transmitting apparatus 30, it is difficult for current to flow from the inside of the communication coupler 31 to the outside due to the high impedance. By the noise current that flows to the outside of the coupler case 41 being reduced, the noise emission is reduced, so that it is possible to satisfy the electric field strength regulations applicable to a communication system.

The above-described first exemplary embodiment may be modified as follows.

First Modified Example

Figure 9:
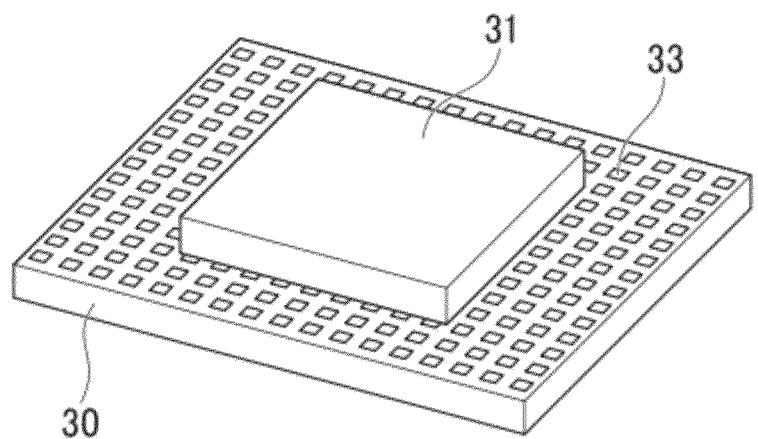
FIG. 9 is a perspective view showing a communication system of a first modified example of the first exemplary embodiment.
Figure 10:
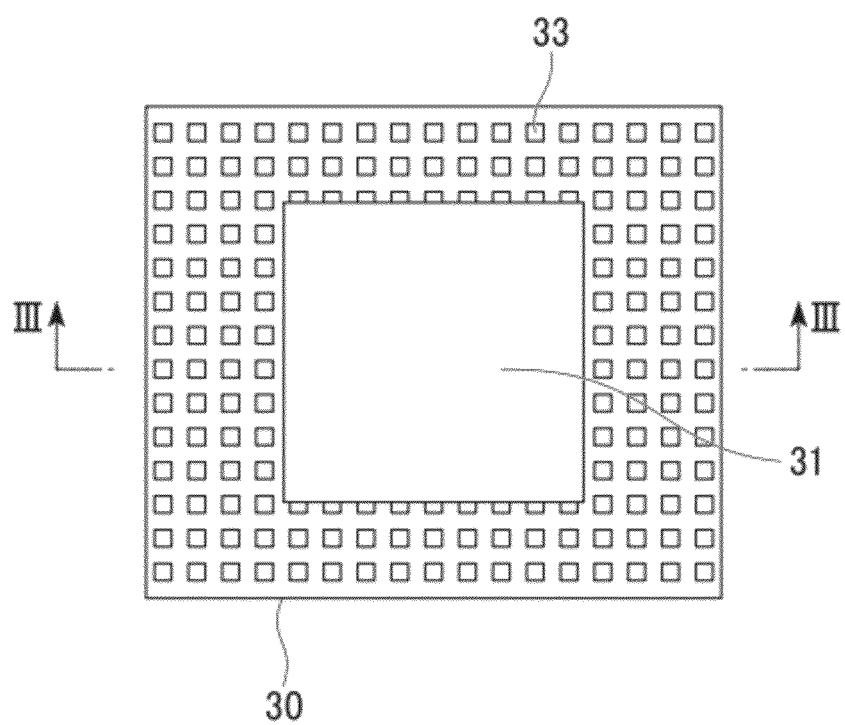
FIG. 10 is a plan view showing the communication system of FIG. 9.

In the above first exemplary embodiment, a communication system in which the cylinder type communication coupler 31 as shown in FIG. 1 and FIG. 2 is used is given as an example. However, this is not a limitation. As shown in FIG. 9 and FIG. 10, the present technology may be used for a rectangular type communication coupler 31 that is formed as a square overall.

Second Modified Example

Figure 11:
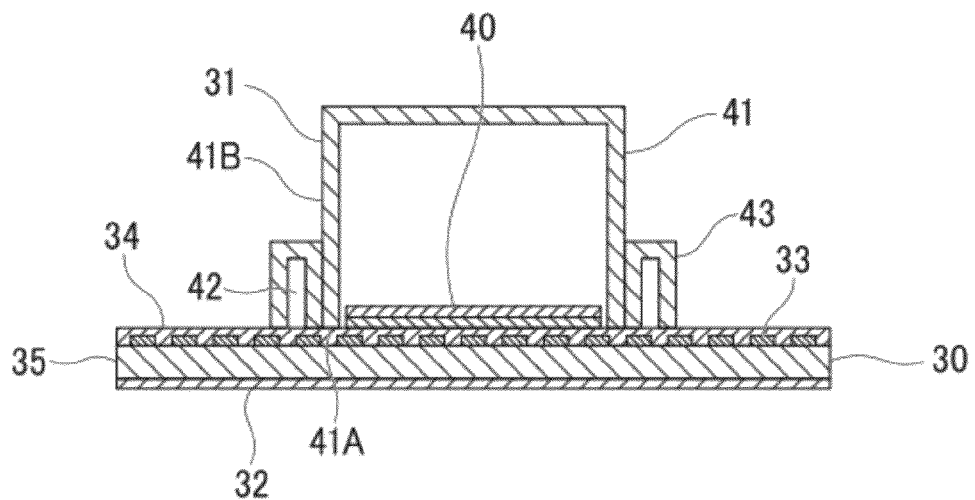
FIG. 11 is a front cross-sectional diagram showing a communication system of a second modified example of the first exemplary embodiment.

In the above first exemplary embodiment, a groove 42 that creates a high impedance is provided in the lower end surface 41 of the communication coupler 31, which faces the signal transmitting apparatus 30. However, such a groove 42 is not limited to being incorporated in the main body 41B (refer to FIG. 3) of the coupler case 41. Alternatively, as shown in FIG. 11, it may be located in a groove housing 43, which forms part of the main body 41B of the coupler case 41, and is located adjacent to the outside of the main body 41B. That is, the groove 42, which is formed in the lower end surface 41A of the coupler case 41, may be provided in the main body 41B of the coupler case 41 or may be provided in the groove housing 43, which is located adjacent to the main body 41B, and forms part of the main body 41B.

Third Modified Example

It may be that only one groove 42 is provided in the lower end surface 41A facing the signal transmitting apparatus 30 such that it is continuous around the circumference of the lower end surface 41A of the coupler case 41 which is formed as a circle overall. Furthermore, a plurality of grooves 42 may be provided such that it is split into segments around the circumference of the lower end surface 41A of the coupler case 41.

Second Exemplary Embodiment

A second exemplary embodiment of the present invention will be described with reference to FIG. 12 to FIG. 14.

The point of difference of the present second exemplary embodiment from the previous first exemplary embodiment is that grooves 42 formed in the lower end surface 41A of the coupler case 41 of the communication coupler 31, which faces the signal transmitting apparatus 30, have a variety of forms.

Figure 12:
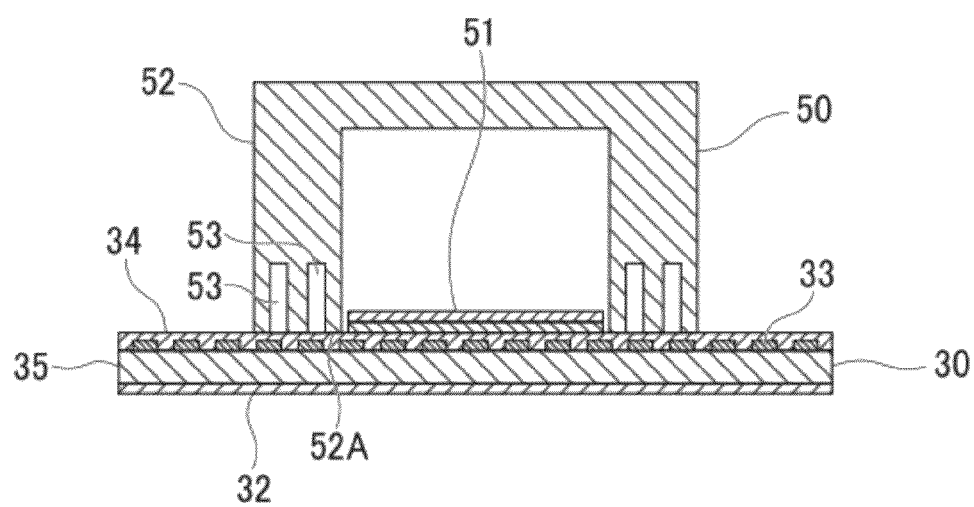
FIG. 12 is a front cross-sectional diagram showing a communication system according to a second exemplary embodiment.
Figure 13:
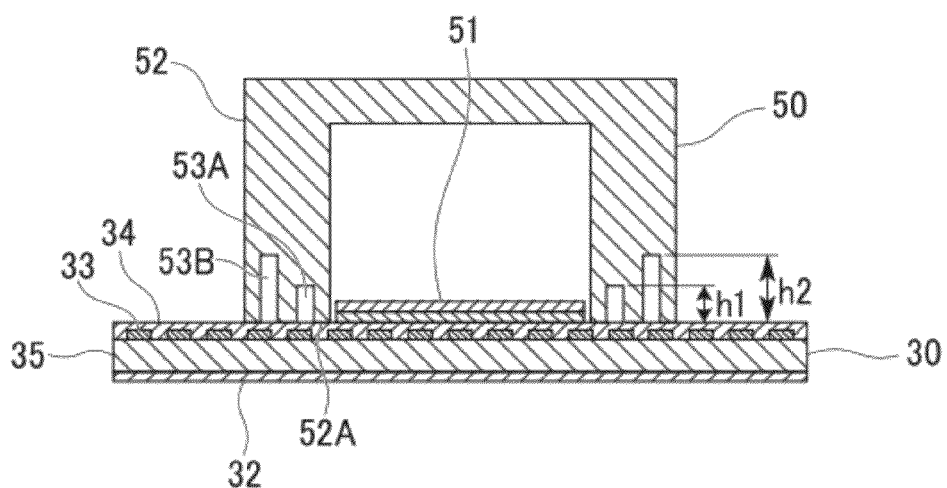
FIG. 13 is a perspective view showing a communication system of a first modified example of the second exemplary embodiment.

To be specific, similarly to the communication coupler 31 of FIG. 1 to FIG. 3, a communication coupler 50 shown in FIG. 12 has an antenna circuit 51, a signal/power transmission and reception circuit (omitted from the figure), and a coupler case 52. The antenna circuit 51 is sheet-shaped, is disposed on the signal transmitting apparatus 30, and is used for communication signals or power transmission and reception. The coupler case 52 is cup-shaped, is formed such that it covers the antenna circuit 51, and its base is open.

In the communication coupler 50, a plurality (a pair in the present example) of grooves 53 that create a high impedance are provided in the lower end surface 52A of the coupler case 52, which makes contact with the protective layer 34 of the signal transmitting apparatus 30. The two grooves 53 are a concave shape body which are formed upward from the lower end surface 52A of the coupler case 52 within the coupler case 52 following the wall surface, and are located such that they are parallel to each other. Moreover, the depths of the concave shape bodies serving as the grooves 53, are formed to be the same.

In such a communication system according to the present second exemplary embodiment, the plurality of grooves 53 that create a high impedance is formed in the lower end surface 52A of the coupler case 52 of the communication coupler 50, which faces the signal transmitting apparatus 30.

With this construction, the impedance of the tip of the coupler case 52 further increases compared with the impedance with one groove 53 as shown in the first exemplary embodiment. As a result, in the communication system according to the present second exemplary embodiment, the noise current that flows from the inside of the communication coupler 50 to the outside decreases, so that it is also possible to obtain an effect that the noise emitted to the outside of the communication coupler 50 can be reduced.

The above-described second exemplary embodiment may be modified as follows.

First Modified Example

In the second exemplary embodiment, the two grooves 53 are formed to the same depth. However, this is not a limitation. For example, the two grooves 53A and 53B may have different depths as shown in FIG. 13. The depth of the inner groove 53A is denoted by "h1", and the depth of the outer groove 53B by "h2". For example, in the case where there are two waves of frequencies that perform signal or power transfer in the present communication system, when the length of one fourth of the wavelength of the first frequency f1 is "($\lambda$1)/4=h1", and the length of one fourth of the wavelength of the second frequency f2 is "($\lambda$2)/4=h2", it is possible to realize an impedance that becomes a short-circuit in the deep part of the grooves 53A and 53B, and an open circuit at the lower end surface 52A of the coupler case 52.

In this manner, by providing a plurality of grooves 53A and 53B in the lower end surface 52A of the coupler case 52, which faces the signal transmitting apparatus 30, and setting the depths of the grooves 53A and 53B to be the lengths of one fourth of the respective wavelengths of a plurality of frequencies that perform signal or power transfer, the impedance of the tip of the coupler case 52 becomes a high impedance at the frequencies used, reducing the noise current of the plurality of frequencies flowing to the outside from the inside of the communication coupler 31, so that it is possible to reduce the noise emitted to the outside of the communication coupler 31.

Second Modified Example

In the first modified exemplary embodiment of the second exemplary embodiment, by providing two grooves 53A and 53B, noise reduction is realized in the case where there are two waves of frequencies that performs signal or power transfer. Alternatively, as shown in FIG. 14, the noise reduction in the case where there are two waves of such frequencies may be realized by one groove 60. That is, the groove 60 shown in FIG. 14 is a concave shape body which is formed upward from the lower end surface 52A of the coupler case 52 within the coupler case 52 following the wall surface. The base of the concave shape body is not parallel to the lower end surface 52A of the coupler case 52, but is provided such that it slopes such that the depth increases toward the outside from the inside.

Figure 14:
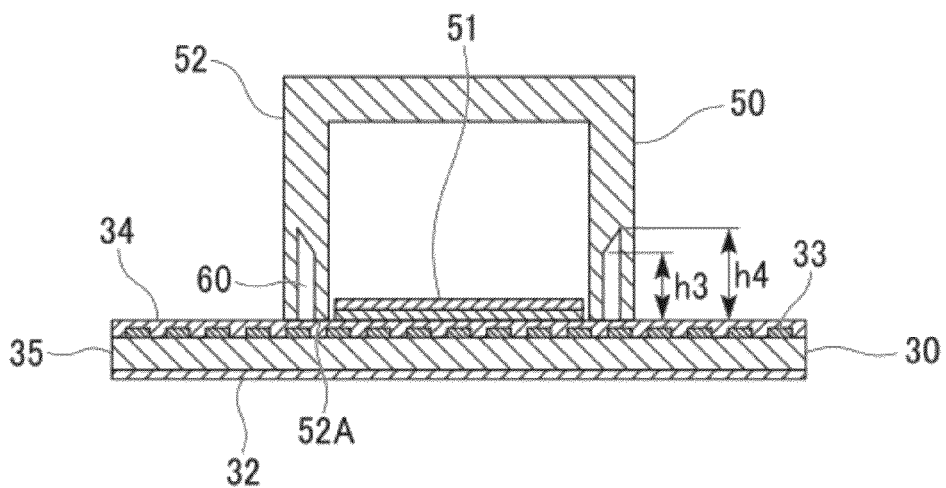
FIG. 14 is a perspective view showing a communication system of a second modified example of the second exemplary embodiment.

As shown in FIG. 14, the depth of the shallowest part of the groove 60, which is located on the inside of the coupler case 52 of the communication coupler 50, is denoted by "h3", and the depth of the deepest part of the groove 60, which is located on the outside of the coupler case 52, is denoted by "h4". For example, in the case where there is a plurality of frequencies that perform signal or power transfer in the present communication system, when the length of one fourth of the wavelength of the highest frequency f1 is "($\lambda$1)/4=h3", and the length of one fourth of the wavelength of the lowest frequency f2 is "($\lambda$2)/4=h4", the impedance may be a continuous short-circuit in the band from f1 to f2 in the deep part of the groove 60, and an open circuit in the lower end surface 52A of the communication coupler 50.

In this manner, in the lower end surface 52A of the coupler case 52, which faces the signal transmitting apparatus 30, the groove 60 is provided, the base of whose cavity shape body is not parallel to the lower end surface 52A of the coupler case 52, but slopes such that its depth increases toward the outside from the inside, and the depths of the groove 60 are the length of one fourth of the wavelength of the highest frequency and the lowest frequency in a plurality of frequencies that perform signal or power transfer. With such a construction, the impedance of the end of the coupler case 52 becomes a high impedance at the frequencies used, reducing the noise current of the plurality of frequencies flowing to the outside from the inside of the communication coupler 50, so that it is possible to reduce the noise emitted to the outside of the communication coupler 50.

The communication coupler 50 shown in the present second exemplary embodiment may be a cylinder type as shown in FIG. 1 and FIG. 2, or may be a rectangular type that is formed as a square overall as shown in FIG. 9 and FIG. 10. Furthermore, 53 (53A, 53B) or the groove 60 may be provided in the main body of the coupler case as shown in FIG. 12 to FIG. 14, or may be provided in the groove housing 43 which is located adjacent to the main body of the coupler case, and forms part of the main body. Moreover, the above-described groove 53 (53A, 53B), and the groove 60 may be provided such that they are continuous around the circumference of the lower end surface 52A of the coupler case 52, which is formed as an overall circle, or a plurality of them may be provided such that they are split into segments and follow the circumference.

Third Exemplary Embodiment

A third exemplary embodiment of the present invention will be described with reference to FIG. 15 to FIG. 17.

The point of difference of the present third exemplary embodiment from the previous exemplary embodiments 1 and 2 is that instead of the grooves 42 and 53, a magnetic substance is provided in the lower end surfaces 41A and 52A of the coupler cases 41 and 52 of the communication couplers 31 and 51, which face the signal transmitting apparatus 30.

Figure 15:
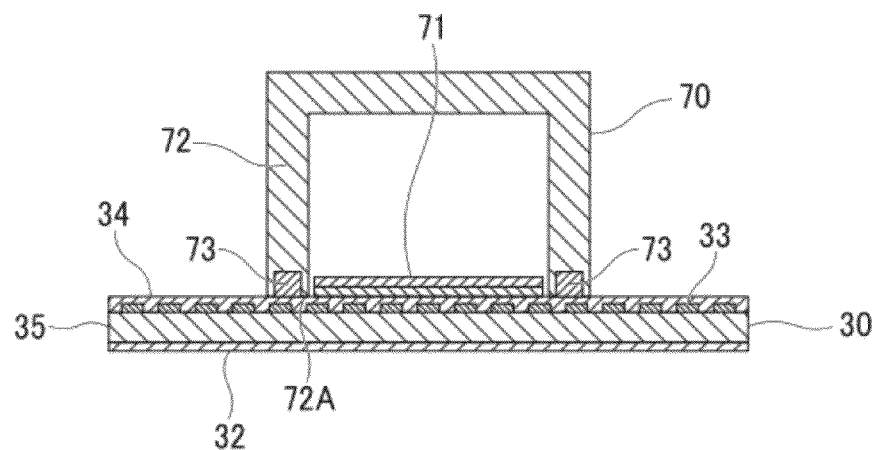
FIG. 15 is a front cross-sectional diagram showing a communication system according to a third exemplary embodiment.

That is, similarly to the communication coupler 31 of FIG. 1 to FIG. 3, a communication coupler 70 shown in FIG. 15 has an antenna circuit 71, a signal/power transmission and reception circuit (omitted from the figure), and a cup-shaped coupler case 72 which is formed such that it covers the antenna circuit 71, and its base is open. The antenna circuit 71 is sheet-shaped, and is disposed on the signal transmitting apparatus 30, and is used for communication signals or power transmission and reception. The coupler case 72 is cup-shaped, is formed such that it covers the antenna circuit 71, and its base is open.

In the communication coupler 70, instead of grooves 42 and 53 such as those in the previous exemplary embodiments 1 and 2, a magnetic substance 73, which similarly creates a high impedance to reduce the local magnetic field strength, is provided in the lower end surface 72A of the coupler case 72, which makes contact with the protective layer 34 of the signal transmitting apparatus 30.

Figure 16:
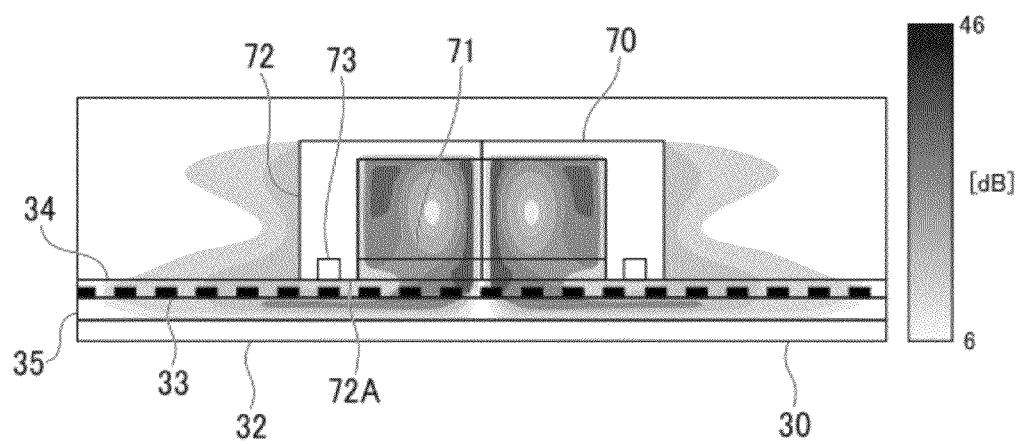
FIG. 16 is a diagram showing the noise leakage state of a communication coupler and a signal transmitting apparatus according to the third exemplary embodiment as a local magnetic field distribution obtained by electromagnetic field simulation.

FIG. 16 shows a local magnetic field distribution obtained by electromagnetic field simulation, for the noise leakage of the communication coupler 70 including the magnetic substance 73, and the signal transmitting apparatus 30, of the present third exemplary embodiment. FIG. 16 shows the local magnetic field strength on the outside of the junction of the signal transmitting apparatus 30 and the communication coupler 70, corresponding to the cross-sectional structure of FIG. 15, using a gray scale.

As is evident by comparison of the local magnetic field distributions of FIG. 16 and FIG. 7 according to the previously described conventional technology, it is confirmed that the strong magnetic field area in the local magnetic field distribution of the third exemplary embodiment, in which the magnetic substance 73 is provided in the communication coupler 70, is reduced from that according to the conventional technology. In the present third exemplary embodiment, it is confirmed that in the magnetic field strength of the outside of the communication coupler 70, a magnetic field strength reduction was achieved greater than or equal to 4 times (2 dB×4=8 dB) using the strength graph on the right hand side of FIG. 16 as a scale.

On the other hand, in a remote electric field strength calculation by electromagnetic field simulation, it was confirmed that the electric field strength from the communication system according to the third exemplary embodiment of the present invention was reduced by 4 dB or more from that of the conventional technology.

In the communication coupler 70 shown in FIG. 16, the arrangement is such that there is a track of the grid-like pattern electrode 33 directly below the magnetic substance 73 on the left side, and there is no track of the grid-like pattern electrode 3 directly below the magnetic substance 73 on the right side. On the other hand, in the communication coupler 70 shown in FIG. 17, the arrangement is such that parts of tracks of the grid-like pattern electrode 33 are directly below the magnetic substances 73 on both left and right sides.

Figure 17:
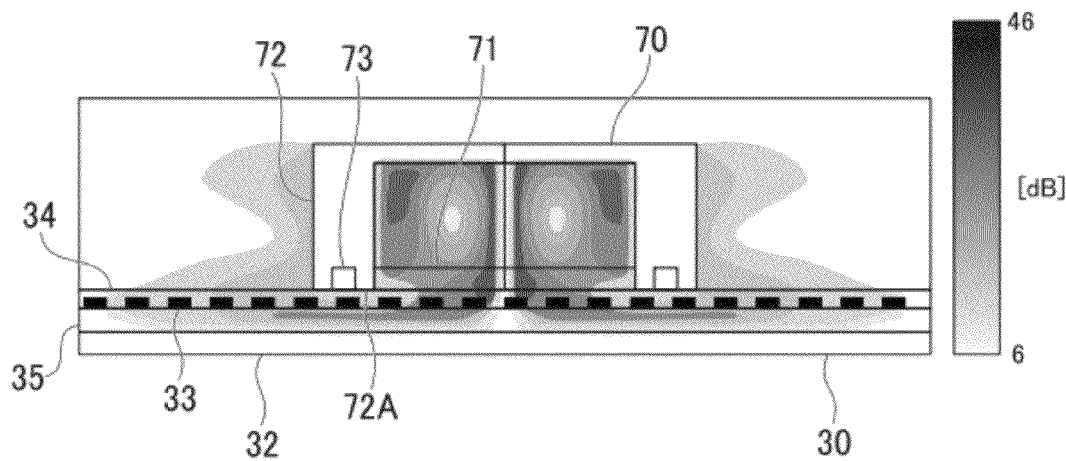
FIG. 17 is a diagram showing a local magnetic field distribution where the locational relationship between grooves and tracks of a grid-like pattern electrode is different from FIG. 16.

When the electric field strengths by electromagnetic field simulation of the communication couplers 70 of FIG. 16 and FIG. 17 are compared, the electric field strength in the lattice arrangement pattern of the grid-like pattern electrode 33 shown in FIG. 17 is less than that of FIG. 16. This confirmed that it is effective to arrange the lattice arrangement pattern of the grid-like pattern electrode such that there is at least part of a track directly below the magnetic substance 73 provided in the coupler case 72 of the communication coupler 70 in order to reduce noise.

As described above, in the communication system according to the present third exemplary embodiment, the magnetic substance 73 is provided in the lower end surface 72A of the coupler case 72 in the communication coupler 70, which faces the signal transmitting apparatus 30. With this construction, it is possible to reduce the magnetic field strength in the vicinity, decreasing the noise current that flows from the inside of the communication coupler 70 to the outside, so that it is possible to obtain an effect that the noise emitted to the outside of the communication coupler 70 can be reduced.

The communication coupler 70 shown in the present third exemplary embodiment may be a cylinder type as shown in FIG. 1 and FIG. 2, or may be a rectangular type that is formed as an overall square as shown in FIG. 9 and FIG. 10. Furthermore, the magnetic substance 73 may be provided in the main body of the coupler case 52 as shown in FIG. 12 to FIG. 14, or may be provided in a groove housing 43 that is located adjacent to the main body of the coupler case, and forms part of the main body as shown in FIG. 11. Moreover, the magnetic substance 73 described above may be provided in a plurality of rows in the lower end surface 72A of the coupler case 72 as shown in FIG. 12. Furthermore, the magnetic substance 73 may be provided continuously around the circumference of the lower end surface 72A of the coupler case 72, which is formed as an overall circle, or a plurality of them may be provided such that they are split into segments and follow the circumference.

As above, the exemplary embodiments of the present invention are described in detail with reference to the figures. However, the specific construction is not limited to these embodiments, and any design change or the like that does not depart from the scope of the present invention is included.

This application is based upon and claims the benefit of priority from Japanese patent application No. 2009-202115, filed Sep. 1, 2009, the disclosure of which is incorporated herein in its entirety by reference.

INDUSTRIAL APPLICABILITY

The present invention may be used in a communication system that includes a sheet-like signal transmitting apparatus, and a communication coupler, which is disposed on the top and transmits signals to the signal transmitting apparatus, and in particular, it may be used in an electromagnetic field leakage suppressing structure which suppresses electromagnetic leakage during communication.

DESCRIPTION OF REFERENCE SYMBOLS

30 Signal transmitting apparatus
31 Communication coupler
33 Grid-like pattern electrode
41 Coupler case
41A Lower end surface
41B Main body
42 Groove (noise suppressing section)
42A Groove (noise suppressing section)
42B Groove (noise suppressing section)
43 Groove housing
50 Communication coupler
52 Coupler case
52A Lower end surface
53 Groove (noise suppressing section)
53A Groove (noise suppressing section)
53B Groove (noise suppressing section)
70 Communication coupler
72 Coupler case
72A Lower end surface
73 Magnetic substance (noise suppressing section)

The invention claimed is:

1. A communication system comprising: a communication coupler that transmits a signal; and a signal transmitting apparatus that communicates by propagating, as an electromagnetic field, the signal transmitted from the communication coupler,
the communication coupler including a coupler case disposed on the signal transmitting apparatus, a noise suppressing section being provided on a lower end surface of the coupler case, the lower end surface facing the signal transmitting apparatus, and the noise suppressing section suppressing noise by creating a high impedance.

2. The communication system according to claim 1, wherein the noise suppressing section is a groove formed in the lower end surface.

3. The communication system according to claim 2, wherein the groove is provided in a groove housing forming part of a main body of the coupler case.

4. The communication system according to claim 2, wherein a plurality of the grooves are formed in the lower end surface.

5. The communication system according to claim 4, wherein the plurality of grooves are each formed with different depths in the lower end surface.

6. The communication system according to claim 5, wherein depths of the plurality of grooves are each set corresponding to one fourth of wavelengths of a plurality of frequencies that perform signal or power transfer.

7. The communication system according to claim 2, wherein a base of the groove is provided so as to slope such that a depth thereof increases toward outside from inside of the coupler case of the communication coupler.

8. The communication system according to claim 7, wherein a depth of a deepest part of the base of the groove and a depth of a shallowest part of the base of the groove are each set corresponding to one fourth of wavelengths of a plurality of frequencies that perform signal or power transfer.

9. The communication system according to claim 2,
wherein the signal transmitting apparatus includes a ground layer that forms a lower electrode, and a grid-like pattern electrode that is a mash shape, and is located at a distance from the ground layer, and
a width of the groove is greater than a width of a track forming the grid-like pattern electrode of the signal transmitting apparatus.

10. The communication system according to claim 1, wherein the noise suppressing section is a magnetic substance provided in the lower end surface.

* * * * *